United States Patent [19]

Fraas et al.

[11] Patent Number: 5,321,766
[45] Date of Patent: Jun. 14, 1994

[54] METHOD AND APPARATUS FOR SYSTEM DOCUMENTATION

[75] Inventors: Karl-Christian Fraas, Schwaig; Klaus-Dieter Kamsties, Adelsdorf; Jürgen Lockau, Erlangen, all of Fed. Rep. of Germany

[73] Assignee: Siemens Aktiengesellschaft, Munich, Fed. Rep. of Germany

[21] Appl. No.: 693,355

[22] Filed: Apr. 30, 1991

[30] Foreign Application Priority Data

Sep. 27, 1990 [EP] European Pat. Off. .......... 90118539

[51] Int. Cl.$^5$ ...................... G06K 9/00; G01B 11/24
[52] U.S. Cl. ...................... 382/8; 395/119; 356/376
[58] Field of Search ............ 382/1, 8; 356/376; 358/88, 107; 395/119; 250/562, 563

[56] References Cited

U.S. PATENT DOCUMENTS

| | | | |
|---|---|---|---|
| 4,573,191 | 2/1986 | Kidode et al. | 382/1 |
| 4,731,853 | 3/1988 | Hata et al. | 382/8 |
| 4,747,411 | 5/1988 | Ledley | 358/88 |
| 4,791,482 | 12/1988 | Barry et al. | 358/107 |
| 4,825,263 | 4/1989 | Desjardins et al. | 356/376 |
| 4,942,618 | 7/1990 | Sumi et al. | 382/8 |
| 4,993,836 | 2/1991 | Furuhashi et al. | 356/376 |
| 5,008,555 | 4/1991 | Mundy | 356/376 |
| 5,046,852 | 9/1991 | Hametner et al. | 356/376 |

FOREIGN PATENT DOCUMENTS 0088503 9/1983 European Pat. Off. .
03644614 4/1990 European Pat. Off. .

OTHER PUBLICATIONS

Photogrammetrie und "Fernerkundung" Book Jun. 1988, pp. 3-12.
Enzyklopädie Naturwissenschaft und Technik, pp. 352-356, insbesondere, p. 354.
ATZ Automobiltechnische Zeitschrift, vol. 91, Nr. 6, 1989, pp. 341-342, 345-347, (Bruhn et al), Title: "Fotogrammetrische Vermessung von Kraftfahrzeugen".
The GEC Journal of Research, vol. 6, Nr. 2, 1988, pp. 80-95 (D. Murray), Title: "Strategies in Object Recognition".

Primary Examiner—Leo H. Boudreau
Assistant Examiner—Chris Kelley
Attorney, Agent, or Firm—Herbert L. Lerner; Laurence A. Greenberg

[57] ABSTRACT

A method for system documentation includes photographing at least part of a system from at least two directions to obtain photographs with a camera having a film plane and a measuring grid plate in front of the film plane. The photographs are digitized. Center lines for individual system parts are separately determined. The digitized photographs are evaluated and a three-dimensional image of the system is prepared with a CAD method from the course of the center lines, for a three-dimensional representation of the system. An apparatus for system documentation includes a camera having a film plane and a measuring grid plate in front of the film plane for taking a photograph of at least part of a system. A digitizing apparatus is provided for the photograph. An apparatus for determining a center line of the system part is connected downstream of the digitizing apparatus. A CAD system is connected downstream of the apparatus for determining the center line.

15 Claims, 2 Drawing Sheets

METHOD AND APPARATUS FOR SYSTEM DOCUMENTATION

The invention relates to a method for system documentation, in which method a system or part of a system is photographed from at least two directions with a camera that has a measuring grid plate in front of a film plane, and in which method the photographs that are made are digitized and then evaluated by CAD. The invention also relates to an apparatus that is suitable for performing such a method.

The journal "Photogrammetrie und Fernerkundung" [Photogrammetry and Remote Sensing] No. 6, 1988, pp. 3-12, discloses a documentation method that uses a camera which is largely equivalent to a conventional, commercially available model. The camera differs from the conventional, commercially available version by having a measuring grid plate installed permanently in front of the film plane. The positions of the individual measuring crosses on the measuring grid plate are known with high accuracy. Since the measuring crosses are also reproduced each time the film is exposed, each picture includes a dense field of reference points. Thus the geometrical effects of film unevenness during picture taking, and picture deformation occurring after the picture has been taken, can be corrected. With a camera equipped in this way, system documentation can be performed without a stereo measuring chamber. A stereo measuring chamber of this kind which is, for instance, required for a documentation method according to Published European Application No. 0 088 503 A2, is very heavy and therefore can only be transported between picture-taking sites in the system at great effort and expense. Moreover, the known stereo measuring chamber is very expensive, as compared with a camera.

The camera, which is equipped with a measuring grid plate, as is disclosed in "Photogrammetrie und Fernerkundung" even makes do without a tripod, so that the necessary photographs can be taken in a very short time. The system to be documented only needs to be entered for a short time.

"Photogrammetrie und Fernerkundung" also discloses that the photographs being obtained are digitized, and that the data material is evaluated by CAD in the field of architectural surveying. With that method, two-dimensional pictures from different viewpoints are obtained.

CAD, which is known per se, is described, for instance, in "Enzyklopdie Naturwissenschaft und Technik" [Encyclopedia of Natural Science and Technology], pp. 352-356, in particular page 354.

With the known method for system documentation, only the surface of the systems and system parts are detected. After being digitized, the photographs are processed directly by CAD.

However, many system parts, particularly pipes, have an outside cross section that differs from their inside cross section. This can be ascribed to irregularities in the system part as well as to irregularities of an insulating layer that as a rule is present on the system part. With the known method, all of these irregularities are documented, even though they are unimportant for further evaluation of the system.

Most systems to be documented contain a medium that is either flowing or at rest. If only the external shape of the system parts is documented, system forms are obtained that can be ascribed to the insulation layer, and such forms do not match the forms taken by the medium. However, the internal forms are the only ones that are of importance for documentation purposes, since the documentation is intended primarily as a basis for checking the safety of the system.

It is accordingly an object of the invention to provide a method and apparatus for system documentation, which overcomes the hereinafore-mentioned disadvantages of the hereto-fore-known methods and devices of this general type, which makes do with a camera largely of the type available on the market and which makes it possible to produce a three-dimensional picture by CAD that documents the inside boundaries of the system which are relevant to the medium in the system. External irregularities of system parts should not distort the documentation.

With the first foregoing and other objects in view there is provided, in accordance with the invention, a method for system documentation, which comprises photographing at least part of a system from at least two directions to obtain photographs with a camera having a film plane and a measuring grid plate in front of the film plane, digitizing the photographs, separately determining center lines for individual system parts, and evaluating the digitized photographs and preparing a three-dimensional image of the system with a CAD method from the course of the center lines, for a three-dimensional representation of the system.

Since the center line of a system part is evaluated, outer irregularities of the system part do not affect the documentation. This is particularly applicable to the documentation of pipelines. It is precisely in pipelines, that fluctuations in thickness of an insulating layer can mistakenly indicate a bend in the pipe. The method of the invention offers the advantage of being able to document only the relevant course of the pipe for the flowing medium.

In accordance with another mode of the invention, there is provided a method which comprises determining location coordinates for selected points from the photographs in an interface, and preparing a model to be shown on a screen in a CAD system from the location coordinates.

For instance, location coordinates for selected points are first determined from the photographs in an interface. A model is then produced in a CAD system from the location coordinates, and this model can be shown on a screen. The CAD system may be a known system, made by the firm Intorgraph. A computer can serve as the interface.

In accordance with a further mode of the invention, there is provided a method which comprises determining the center line individually for individual system parts.

When documenting other system parts, such as pumps or fittings, the parts are, for instance, detected in increments. For a fitting, for instance, the center lines of, the main body of the fitting of, the delivery neck and of the discharge neck are determined separately.

An advantage of the method of the invention is that the relevant structure for safety testing of a system is documented three-dimensionally. Such a method can advantageously be used not only in power plants, but also in chemical plants, which contain a great number of pipelines and containers.

In accordance with an added mode of the invention, there is provided a method which comprises determining a center line of a tubular system part by determining at least two points along the center line, determining one of the points by taking at least two photographs from different directions; determining one elliptical image of a cross section of the system part through a selected surface point of the system part on the photographs; determining intersections of main axes of ellipses for each elliptical image; and three-dimensionally determining and digitizing a point on the center line as an intersection of straight lines disposed perpendicularly to the photographs through the intersections.

It is thus seen that in order to determine a center line of a system part that is tubular, two points of the center line are, for instance, determined. For each point, at least two photographs are taken from different directions. Two photographs suffice. With at least one further photograph, the results can be confirmed. These photographs can then be digitized point by point at the sites to be documented. The term "digitizing" is understood to be the determination of coordinates, for example. Next, for a particular selected surface point of the system part, one elliptical picture on the photograph is determined for a cross section of the system part through this point. Such a picture is an ellipse, since the cross section on the photograph appears from a point of view that is oblique to the surface of the system part. For a system part that as a rule is not transparent, only half of the ellipse is visible. This half is supplemented with the missing half, for instance graphically. The intersection of the main axes of the ellipse is then determined and digitized. This intersection is an indication of a point on the center line. An intersection of the main axes of a second elliptical image is also determined, on a second photograph. Since the photographs have been taken from different directions, the location of one point on the center line can be determined in three-dimensional space from the two intersections. For this purpose, the intersection of the normals to the planes of the photographs at the intersections of the ellipse axes is determined as a point of the center line. At least one second point of the center line is determined in the same way. The center line is then determined by these two points.

In this way, a course of the center line that is independent of irregularities in the outer surface of the system part is obtained.

In accordance with an additional mode of the invention, there is provided a method which comprises taking the two photographs, for instance, from directions that are 90° apart. This makes for the greatest measurement accuracy. However, the angle need not always be 90°.

In accordance with yet another mode of the invention, there is provided a method which comprises further smoothing the course of the initially determined center line, for instance, by error observation. This is done to provide even better adaptation of the course of the determined center line to the actual course of the center line.

In accordance with yet a further mode of the invention, there is provided a method which comprises further smoothing the course of the initially determined center line with the known method of least error squares, for example.

In accordance with yet an added mode of the invention, there is provided a method which comprises exactly determining only coordinates in axes perpendicular to a pipe axis, during the determination of the center line of a system part having the form of a straight tube.

The coordinate in the axial direction is not as important as the other coordinates, since the beginning and end of the pipe or pipe segment are accurately determined by the system parts connected to them. The advantage of this selection of coordinates is that locational determination in two coordinates suffices to produce a three-dimensional picture.

This simplification is not possible in the documentation of curved system parts. However, since in an overall system to be documented as a rule there are a great many straight pipeline segments, the total expenditure of labor is markedly reduced with the known method.

In accordance with yet an additional mode of the invention, there is provided a method which comprises attaching a marking device on a system part having neither a corner nor an edge; and then photographing the system part.

It is thus seen that a marking device can be mounted on a system part that has neither a corner nor an edge. Only then is the system part photographed. Such a marking is necessary so that photographs taken from different directions can be unequivocally distinguished from one another. In system parts that do have corners or edges or other external features, these features serve to identify the various pictures. With round system parts, such as pipes, such identification is not possible. In fact, photographs of a pipe taken from different directions largely look the same. It is therefore necessary according to the invention for markings which unequivocally show the direction from which the photograph was made to be applied to the system part.

In accordance with again another mode of the invention, there is provided a method which comprises placing marking parts carrying numbers on the system part, as the marking device. For instance, stick-on markers that carry numbers are particularly well-suited for this purpose.

An advantage attained with the method of the invention is that a system can be documented with simple means, without having to take external formations or accretions, such as insulating layers, into consideration.

With the second object of the invention in view, there is also provided an apparatus for system documentation, comprising a camera having a film plane and a measuring grid plate in front of the film plane for taking a photograph of at least part of a system, a digitizing apparatus for the photograph, an apparatus for determining a center line of the system part said apparatus connected downstream of the digitizing apparatus, and a CAD system connected downstream of the apparatus for determining the center line.

An advantage of the apparatus for determining the center line is that external irregularities of a system part, such as a pipe, which are unimportant for a medium located in the system, are still not taken into account in the system documentation. The course of a tubular system part can be well determined by visually displaying the elliptical surface resulting from a circumferentially attached marking in combination with a perspective view, and the intersection of the main ellipse axes is determined as a point of an imaginary pipe axis or center line and digitized.

In accordance with another feature of the invention, the CAD system is, for instance, preceded by a correction unit for smoothing the determined center axis by means of error observation.

With an apparatus of this kind, a complex system can be documented quickly and reliably. Three-dimensional pictures of the system are obtained that do not take into account external irregularities which can be ascribed, for instance, to insulating layers. In the CAD method, the three-dimensional pictures make it possible for views of the system to be documented to be shown on a screen from various viewpoints For instance, in accordance with a further feature of the invention, the digitizing apparatus, the apparatus for determining the center line and the correction unit together form an interface between the camera and the CAD system. This interface may be a computer.

In accordance with an added feature of the invention, the CAD system is connected to a screen for showing the documented system.

In accordance with an additional feature of the invention, there is provided a marking device disposed on a system part to be photographed having neither a corner nor an edge.

The advantage of this feature is that a system part of this kind that lacks identifying points is equipped with such identifying points by the marking device. It is only with these markings that it is possible for pictures taken from different directions to be unequivocally distinguished from one another.

In accordance with a concomitant feature of the invention, the marking device, for instance, is in the form of a tape that can be placed on the system part and has marking elements. These marking elements are, for instance, numbered.

An advantage obtained with the method and apparatus according to the invention is that through simple means, an extensive system that may include a great number of pipelines can be documented exactly, quickly and reliably.

Other features which are considered as characteristic for the invention are set forth in the appended claims.

Although the invention is illustrated and described herein as embodied in a method and an apparatus for system documentation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
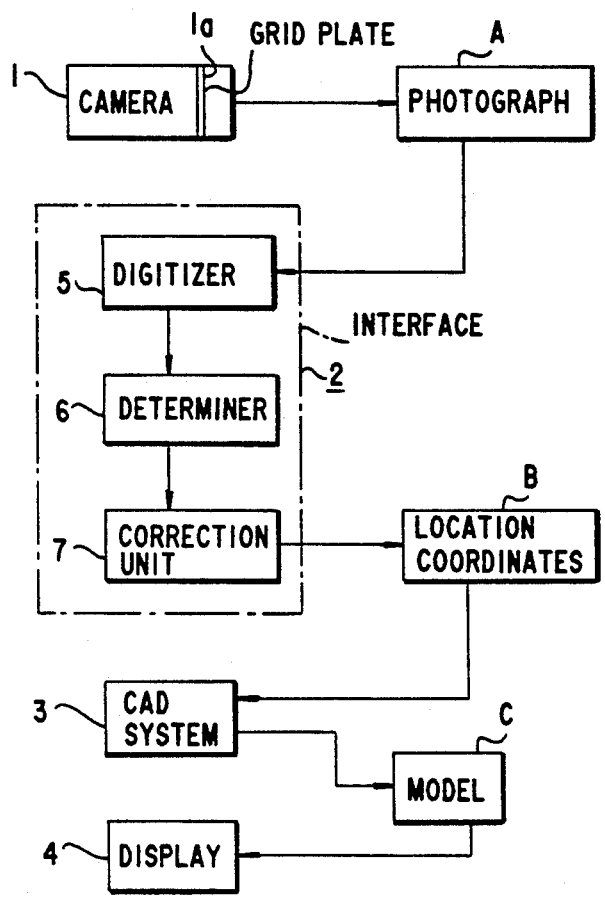
FIG. 1 is a block circuit diagram showing the layout of an apparatus for system documentation, from which the course of the method can also be seen.

Referring now to the figures of the drawing in detail and first, particularly, to FIG. 1 thereof, there is seen a system documentation which is prepared according to the invention by first photographing the system to be documented from at least two directions using a commercially available camera 1, having a measuring grid plate 1a in front of a film plane. Photographs A which are obtained are processed in an interface 2. Location coordinates B for various essential points of the plant to be documented are then available at an output of the interface 2. The coordinates B are carried to a CAD system 3 connected downstream of the interface 2. A three-dimensional image or model C is prepared there from these coordinates B. The model C can be shown on a screen 4, and views from various angles can be displayed.

The interface 2 is divided into a digitizing apparatus 5, an apparatus device 6 for determining a center line 13 of a tubular system part 10, and a correction unit 7. The digitizing apparatus 5 can also be disposed either on the output side of the apparatus 6 or on the output side of the correction unit 7. In the digitizing apparatus 5, each photograph A is at least partly broken down into digital values to be processed further. In the apparatus 6 connected to the output side of the apparatus 5, two points on the center line 13 are first determined in accordance with FIG. 4, in order to determine the center line 13. For each point, at least two photographs A that show a surface point 14 of the system part 10 are used. A circumferential line of a cross section of the system part 10 through the surface point 14 is shown on both photographs, in each case as a fragment 15 of an ellipse. The ellipses are completed there, and the intersections of the main axes of each ellipse are marked on the photograph. Straight lines passing through the intersections on both photographs, which are perpendicular to the plane of the photograph, intersect at a point 16 of the center line 13 of the system part 10. The two photographs taken from different angles enable a three-dimensional marking of the point 16. Two points 16 which are determined in this way then determine the center line 13. It is easier to determine the ellipse if a marking device 9 of FIG. 2 extends through the surface point 14.

The exact course of the center line 13 is determined from the observed courses of the outer boundaries of the system part 10. This eliminates the influence of the wall thickness of the system part 10.

In the subsequent correction unit 7 of FIG. 1, the already determined course of the center line 13 is further smoothed with the known method of least error squares.

The model C, which can be shown on the screen 4, largely corresponds to the actual course of pipelines and to the actual course of the system to be documented as well.

Figure 3:
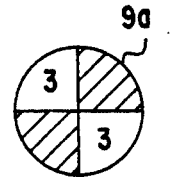
FIG. 3 is an elevational view of a marking element as a component of such a marking device.
Figure 2:
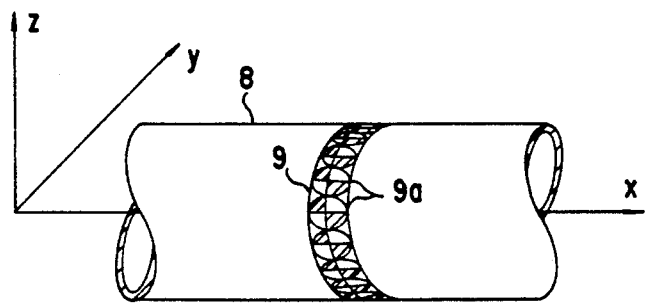
FIG. 2 is a fragmentary, diagrammatic, perspective view of a tubular system part that is provided with a marking device.

If a system part has neither corners nor edges, then photographs A taken from different directions are very difficult to distinguish from one another. This is true particularly for pipelines. In order to provide a remedy for this problem, a round system part 8 of this kind should be equipped with a marking device 9, as shown in FIG. 2, even before the photographs are made. This marking device 9 is in the form of a tape that should be disposed on a circumference of the round system part 8. The tape 9 can be adhesively attached, for instance. Individual numbered marking parts 9a are located on the tape, so that various photographs A of the same system part 8 are distinguished by the fact that different numbered marking parts 9a are visible. One example of a numbered marking part 9a of this kind on the marking device 9 is shown in FIG. 3. Sequential numbering is usually selected on the marking device 9.

In order to simplify this system documentation, for straight, tubular system parts, it is possible in accordance with Fig. 2 to construct the coordinate system, which is necessary for determining the model C from the photographs A, in such a way that one axis, for instance the X axis, of the coordinate system coincides with the axis of the tubular, round system part 8. The location of the coordinate system is shown in FIG. 2. The direction of the round system part 8 of FIG. 2 is already determined between two adjacent elbows or fittings by the X axis.

Accordingly, only two coordinates, namely the Y axis and the Z axis, need to be evaluated. Since a typical system to be documented, in particular a chemical plant, has a great many straight pipeline segments, the labor and expense for documentation are thus reduced markedly.

Figure 4:
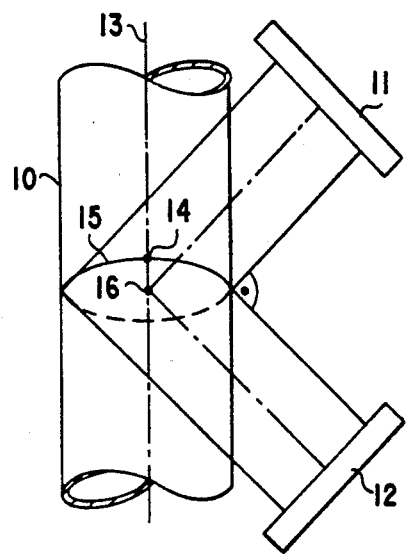
FIG. 4 is an elevational view of suitable picture-taking positions for a system part.

The required photographs A are taken from directions that are offset by 90°, for example. Two picture taking positions for one system part 10 are shown in FIG. 4. Two positions of the camera 1 are shown by positions of film segments 11 and 12 to be exposed. The film segments (photographs) 11 and 12 form an angle of 45° with the system part 10 and an angle of 90° with one another.

Figure 5:
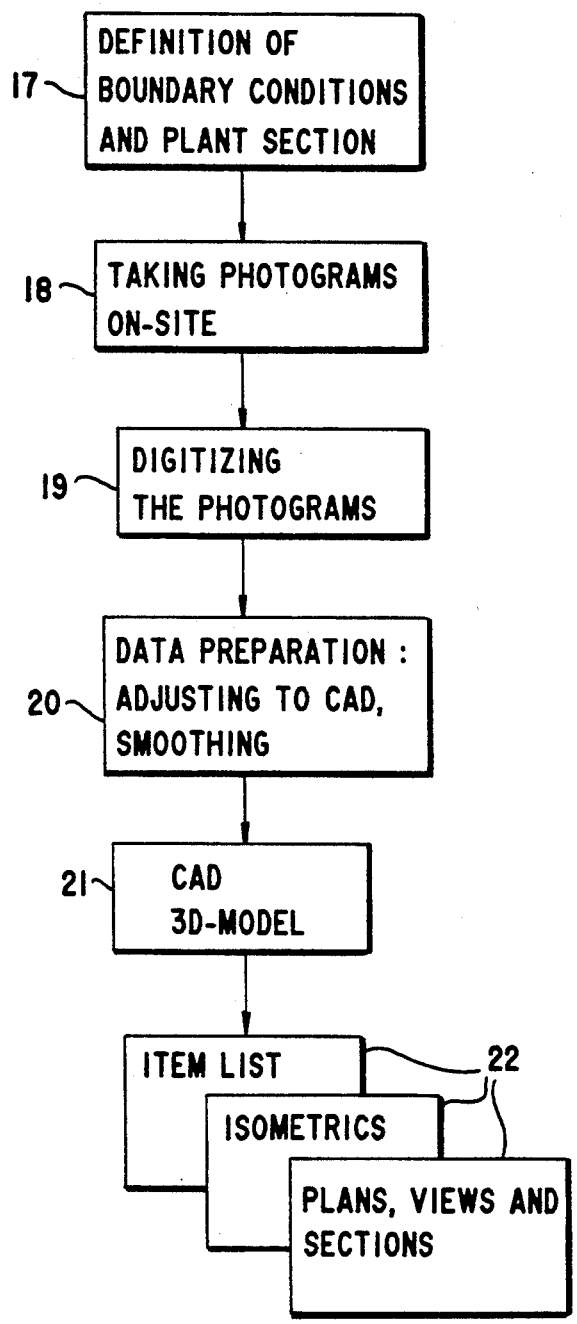
FIG. 5 is a flow chart of a method for system documentation.

The method for system documentation is represented in FIG. 5 by a flow chart. First, in a preliminary step 17, the portion of the system part to be documented is found. Then, in a first step 18, photographs are made. In a second step 19, the photographs are digitized. In a third step 20, the center line for the portion of the system part is determined according to the invention from the digitized photographs. A correction can also be performed, by the method of least error squares. This is followed in a fourth step 21 by the known CAD method. The result is plans, sectional views, views from various angles, and so forth of the portion of the system part, represented by reference numeral 22.

With the apparatus shown and the associated method, systems of high spatial density (a great number of pipelines in a small space), in particular power plants or chemistry plants, can be documented quickly and reliably with simple means. The systems therefore only need to be entered briefly, so that the operation of the system is only insignificantly impeded. The model C permits views of the system from various directions that are limited to what is essential.

We claim:

1. A method for system documentation, which comprises photographing at least part of a system from at least two directions to obtain photographs with a camera having a film plane and a measuring grid plate in front of the film plane, digitizing the photographs, separately determining center lines for individual system parts, by determining at least two points along each center line, determining one of the points by taking at least two photographs from different directions; determining one image of a cross section of one system part through a selected surface point of the system part on each of the photographs; determining intersections of main axis of each image; and three-dimensionally determining and digitizing a point on the center line as an intersection of straight lines disposed perpendicularly to the photographs through the intersections of the main axes, and evaluating the digitized photographs and preparing a three-dimensional image of the system with a CAD method from the course of the center lines, for a three-dimensional representation of the system.

2. The method according to claim 1, which comprises determining location coordinates for selected points from the photographs in an interface, and preparing a model to be shown on a screen in a CAD system from the location coordinates.

3. The method according to claim 1, which comprises determining the center line individually for individual system parts.

4. The method according to claim 1, which comprises taking three photographs from directions being mutually offset by 90°.

5. The method according to claim 1, which comprises smoothing the determined course of the center line by an error observation.

6. The method according to claim 5, which comprises further smoothing the course of the initially determined center line with the method of least error squares.

7. The method according to claim 1, which comprises exactly determining only coordinates in axes perpendicular to a pipe axis, during the determination of the center line of a system part having the form of a straight tube.

8. The method according to claim 1, which comprises attaching a marking device on a system part having neither a corner nor an edge; and then photographing the system part.

9. The method according to claim 8, which comprises placing marking parts carrying numbers on the system part, as the marking device.

10. An apparatus for system documentation, comprising a camera having a film plane and a measuring grid plate in front of said film plane for taking a photograph of at least part of a system, a digitizing apparatus for the photograph, an apparatus connected to said digitizing apparatus, said apparatus having means for determining a center line of the system part by determining at least two points along the center line, determining each of the points by taking at least two photographs from different directions; determining one image of a cross section of the system part through a selected surface point of the system part on each of the photographs; determining main axes for each image and determining intersections of the main axes; and three-dimensionally determining a point on the center line as an intersection of straight lines disposed perpendicularly to the photographs through the intersections of the main axes, and a CAD system connected downstream of said apparatus for determining the center line.

11. The apparatus according to claim 10, including a correction unit connected between said apparatus for determining the center line and said CAD system.

12. The apparatus according to claim 11, wherein said digitizing apparatus, said apparatus for determining the center line and said correction unit together form an interface.

13. The apparatus according to claim 10, including a screen connected to said CAD system.

14. The apparatus according to claim 10, including a marking device disposed on said system part to be photographed having neither a corner nor an edge.

15. The apparatus according to claim 14, wherein said marking device is a tape that is to be disposed on said system part and having marking parts.

* * * * *